United States Patent Office 3,334,437
Patented Aug. 8, 1967

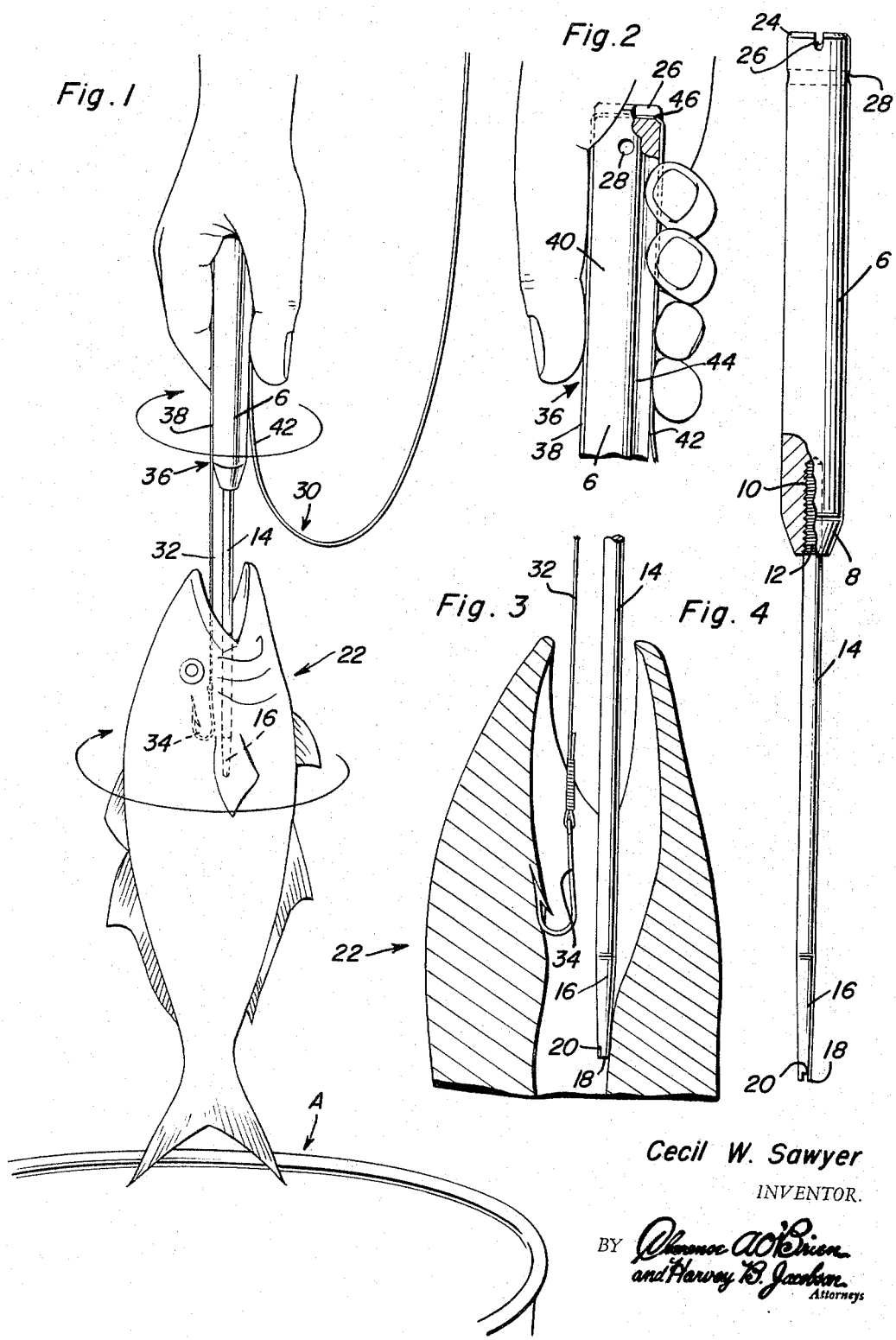

3,334,437
FISHHOOK DISLODGING AND EXTRACTING
IMPLEMENT
Cecil W. Sawyer, 571 Swan Ave.,
Miami Springs, Fla. 33166
Filed July 31, 1964, Ser. No. 386,545
1 Claim. (Cl. 43—53.5)

This invention relates to a hand tool or implement which is novelly constructed and adapted to enable the user to readily and easily dislodge and extract a hook-equipped fishline leader from a hooked fish in a simple but reliable manner.

Briefly, the implement comprises an elongated spindle or shaft provided at its rearward end with a handgrip. The shaft is preferably, but not necessarily, separably connected at its rearward end to the forward end of the handgrip for compactness and convenience when storing the out-of-use implement in the user's tackle box. The rearward end of the handgrip is provided with an open-ended leader seating kerf in which a bent portion of the looped leader is temporarily anchored and manually snubbed in a manner to be hereinafter explained.

The state of the art to which the present invention relates is exemplified by such prior patents as Nelson 1,629,583, Ford 2,289,767 and others not necessary to identify here. Admittedly, it is old in the fishhook extractor art to provide a tool having a shank or shaft with a handle or grip at the handgripped end. However, it must be observed that in these prior reference patents, the leading for forward end of the shaft has claw or equivalent means which must be directly engaged with the bend or barb (or both) of the fishhook in order to assist the user in probing, prying and freeing the fishhook. By contrast, the piloting and orienting tip of the fish spinning spindle in the herein disclosed implement is clawless. In fact, it is not intended to physically connect itself at any time to the fishhook.

It follows that an object of the present invention is to provide an implement which enables the user to suspend and bodily twirl or spin the fish around the shaft or spindle, whereby the centrifugal force thus generated will free the line suspended fish and cause it to drop by gravity to the surface or, alternatively, into a receiver such as a bucket or the like.

In carrying out the principles of the present invention the handgrip is stout and has a flat rearward end provided with an open-ended kerf. With this construction and co-ordination of features the portion of the lead proximal to the fish can be looped over the handgrip with one component of the loop on one side of the same, the other component on a diametrically opposite side and the intervening or bight portion seated and thus snubbed in the anchoring kerf. By tautening the loop, gripping the same tightly against the handgrip surfaces and employing a twist of the wrist, the desired impetus and twirling spin is imparted to the releasable fish.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in elevation showing the improved fishhook dislodging and extracting tool or implement, how the hook-equipped leader of the line is looped or held and how the fish is suspended and twirled, freed and allowed to drop into the receptacle or receiver;

FIGURE 2 is an enlarged view of the handgrip with a portion broken away and shown in section and wherein the manner of gripping the handle and looped leader is fully shown;

FIGURE 3 is a view showing a portion of the fish in section and illustrating the embedded hook and the manner in which the probing and piloting tip of the spindle is passed through the mouth and into the throat of the fish; and FIGURE 4 is a view in side elevation suitably enlarged and with a portion broken away and appearing in section.

Referring first to FIG. 4 the handle means comprises an elongated stout rigid handgrip 6 which in practice is some five or six inches in length and preferably circular in cross-section. The forward end portion 8 is of truncated conical form and this end portion has an axial screw-threaded socket 10 into which the screw-threaded shank portion 12 of the shaft or spindle 14 is removably screwed. The forward leading end of the shaft is progressively tapered and provides a piloting and probing tip 16. The terminal end 18 is flat and accordingly blunt and is provided with a notch 20 to accommodate a screwdriver (alternatively a dime) whereby to facilitate the step of attaching and detaching the shaft. The shaft is of a cross-section less than the cross-section of the handgrip and is linearly straight and in practice is five or six inches in length, is smooth-surfaced and of a requisite length to permit the same to be employed in association with the fish 22 as suggested in FIGS. 1 and 3. The rearward end of the handgrip is substantially flat as at 24 and is provided with a centrally located open-ended kerf 26. There is also a transverse bore 28 which can be used for the attachment thereto of a cord, chain or the like (not shown) this being an optional feature. This is to say, one may desire to attach a looped wrist-encircling cord to assist in manually handling the device or to be employed merely in hand-carrying the implement from place to place or hanging it up in a ready-to-use place.

The leader portion of the fishline is denoted generally by the numeral 30. The leading end portion thereof is denoted at 32 and is provided with a conventional barbed fishhook 34 which in the present disclosure thereof is shown embedded in the mouth of the fish 22 in FIG. 3. The aforementioned looped portion of the leader which is tautened and is rigged in position over the handgrip is denoted at 36. One portion 38 thereof is shown stretched tightly along the side 40 (FIG. 2) of the handgrip.

The other component or portion is denoted at 42 and this is drawn tightly down against a diametrically opposite side 44 of the handgrip. The intervening or bight portion 46 is shown seated and temporarily anchored in the snubbing kerf 26. Thus the instrument itself is shown in detail in FIG. 4 and the manner in which it is employed in actual practice is shown completely in FIG. 1 and partly in FIGS. 2 and 3, respectively.

It will be understood that the groove or notch 20 in the end 18 is of secondary importance but is thought to be helpful in enabling the user to assemble and disassemble the principal component parts, that is the handgrip 6 and the spindle or shaft 14.

Satisfactorily usable implements of the type herein shown and described have been made from lightweight polished non-corrodible aluminum. Equally satisfactory implements can be made from moldable plastic material.

It is significant to note in connection with the mode of using the implement that the inserted end portion of the shaft or spindle is not physically connected with the hook 34. It merely assumes a position alongside of the hook and, while the terminal 18 may take a position directly to the right of the bent portion of the hook 34 it preferably assumes a position projecting slightly beyond the bend in the manner shown. It should be noted, however, that there is no physical connection between the spindle and the hook. It is permissible to use the implement without touching the fish by simply inserting the forward portion of the spindle or shaft into the mouth and throat of the fish, holding the fish over a pan or bucket, imparting a spin or twirl thereto and allowing the fish to drop by gravity into the bucket A (FIG. 1). Manifestly, one can, of course, hold the fish with one hand to start with, insert the spindle into the mouth and throat as shown and resort to the unique spin-out result.

To assure best results the portion 36 of the leader is formed into a loop and the components 38 and 42 are drawn tightly and gripped firmly to thus link the implement and leader together. Then, the fish is permitted to hang or suspend itself from the hooked end 34 of the line. Accordingly, by imparting a twist of the wrist and hand to the gripped handgrip the desired impetus and following twirling and spin-out result is attained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restorted to, falling within the scope of the invention as claimed.

What is claimed as new is as follows:

A manually actuatable implement for dislodging and extracting a hook-equipped leader or line from a hooked fish comprising: an elongated spindle-like shaft having forward and rearward ends, the forward end of said shaft being adapted to be inserted lengthwise into the mouth and throat of the fish and, while the fish is momentarily held with one hand, then positioned for action proximal to the embedded hook but free of positive connection, in any manner, with said hook, a handgrip secured to the rearward end of said shaft and adapted to be firmly gripped by the hand of the user in a manner to forcibly twirl the now freely suspended ungripped fish relative to and around the long axis of the shaft either clockwise or counterclockwise, said shaft being circular in transverse cross-section and said forward end being progressively reduced in cross-section and providing a tapered piloting and probing tip, said handgrip being provided at its rearward end with an open-ended kerf in which a bent portion of the hand-looped leader is seated and thus anchored in a manner to assist the user in positioning, snubbing and getting a gripping hold on the leader and to assure conjoint handling of the implement and grippingly held leader, whereby to impart an impetus to the now centrifugally twirlable and ultimately releasable fish, the forward end of said handgrip being provided with an axial screw-threaded socket, the rearward end of said shaft being screw-threaded and removably secured into said socket, whereby to permit the shaft and handgrip to be separated for storage in a tackle box when not intended to be used, the leading end of said probing tip being flat and provided with a notch for a screwdriver or the like.

References Cited

UNITED STATES PATENTS

| | | | |
|---|---|---|---|
| 2,447,554 | 8/1948 | Bates | 43—53.5 |
| 3,034,252 | 5/1962 | Basinski | 43—53.5 |
| 3,154,879 | 11/1964 | Crooke | 43—53.5 |

FOREIGN PATENTS

| | | |
|---|---|---|
| 236,236 | 12/1925 | Great Britain. |
| 605,544 | 7/1948 | Great Britain. |

ABRAHAM G. STONE, *Primary Examiner.*

SAMUEL KOREN, *Examiner.*

R. L. HOLLISTER, *Assistant Examiner.*